Sept. 27, 1949.　　　　　E. BOBARD　　　2,483,177
MOTOR-CONTAINING WHEEL
Filed March 15, 1945　　　　　　　2 Sheets-Sheet 1
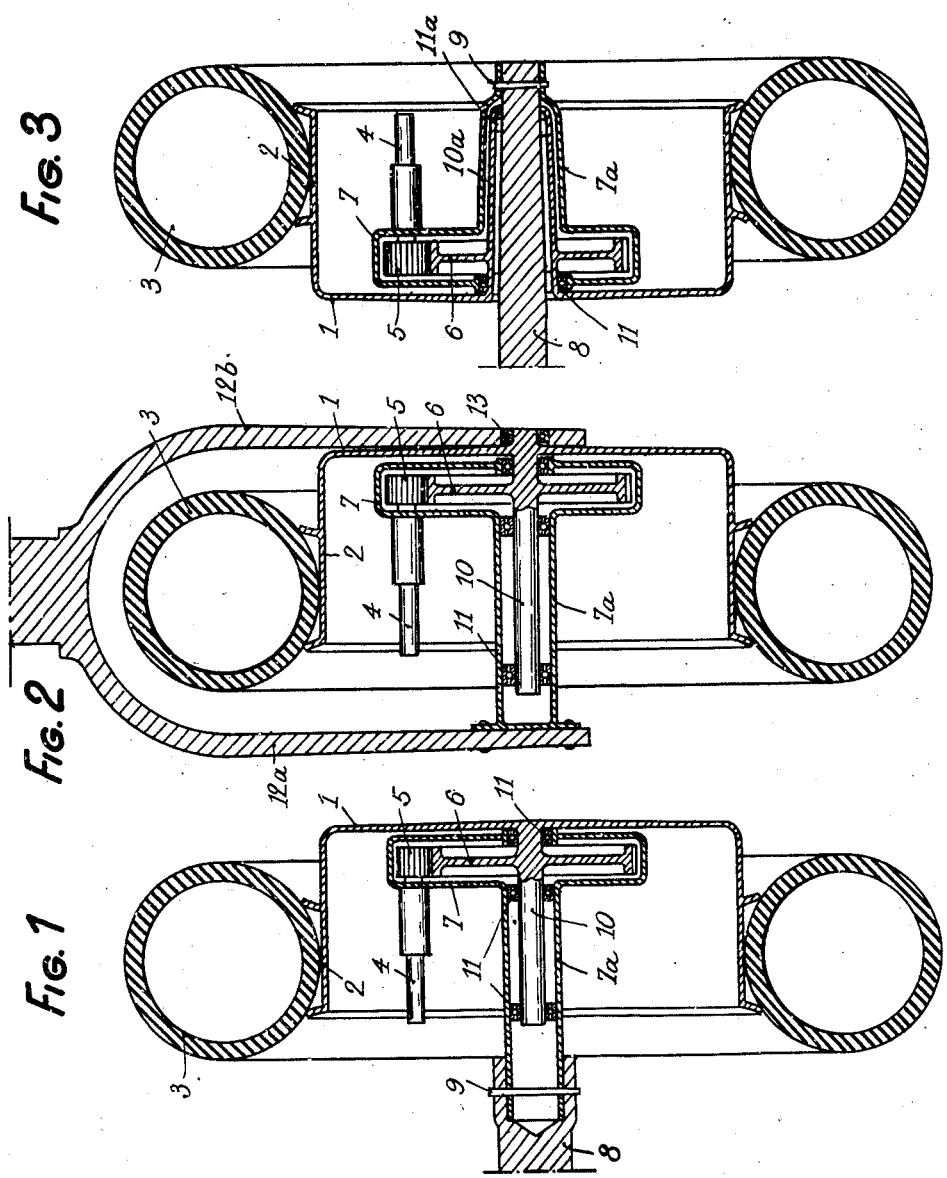
Inventor
EMILE BOBARD
by his attorneys
Howson and Howson.

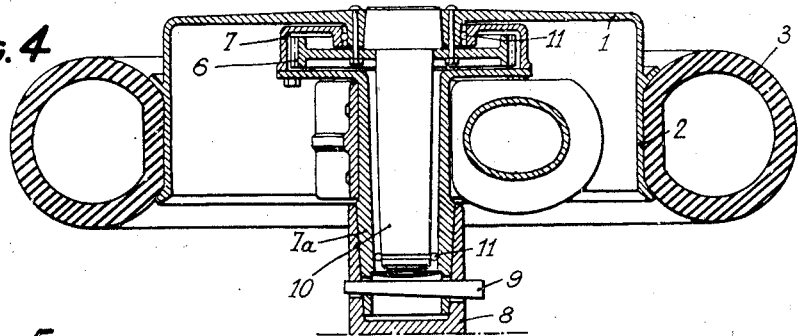
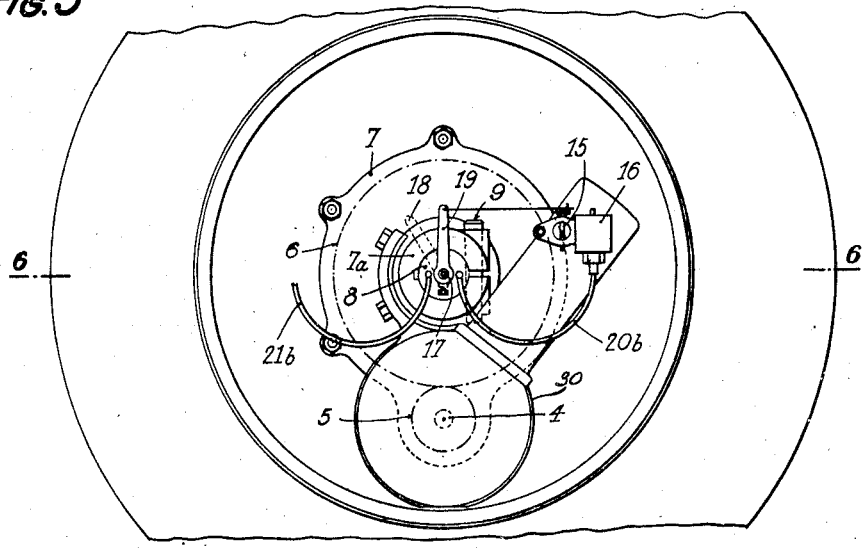
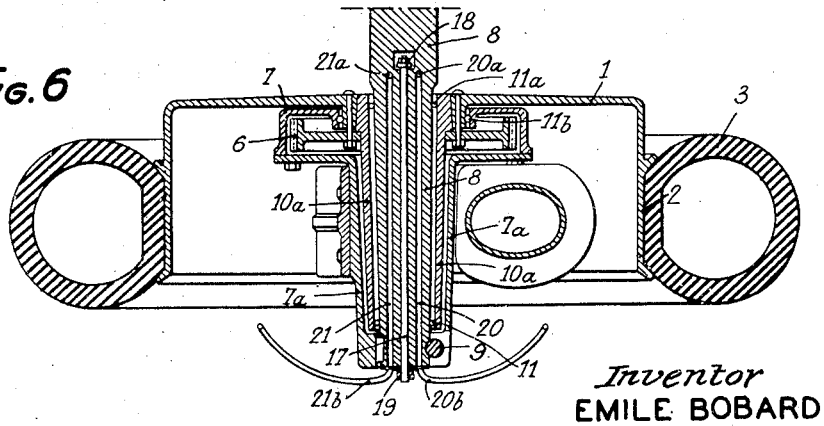

Patented Sept. 27, 1949

2,483,177

UNITED STATES PATENT OFFICE 2,483,177

MOTOR-CONTAINING WHEEL

Emile Bobard, Beaune, France

Application March 15, 1945, Serial No. 582,881
In France June 3, 1942

Section 1, Public Law 690, August 8, 1946
Patent expires June 3, 1962

6 Claims. (Cl. 180—10)

My invention has for its object improvements in those wheels which are associated with a motor located inside the rim of a wheel the disc of which is asymmetrically arranged with reference to the plane of rolling of the rim, said motor being mounted so as to remain stationary with reference to the rotary rim.

These improvements are intended to make the mounting of the wheel easier with reference to all various types of vehicle frames and to allow a better utilization of the space available inside the rim.

The invention concerns further means to make easier the transmissions for the control and the feeding of the motor when the wheel is mounted and avoiding any floating transmissions.

I have shown by way of example in accompanying drawings several forms of execution of my invention.

Figs. 1 to 3 show diagrammatically three modifications of the mounting of the wheel on its vehicle frame.

The Fig. 4 shows in cross-section a practical realization of the device of Fig. 1.

The Figures 5 and 6 concern the device of Fig. 3, the Fig. 5 being an end view and the Fig. 6 a cross-section through the line 6—6 of Fig. 5.

The motor-containing wheel is of the usual type having a solid disc offset with reference to the rim. The disc is shown at 1, the rim at 2 and the usual tire at 3.

In conformity with my invention, the motor 30 has its shaft 4 offset with reference to the wheel axis while remaining parallel thereto and transmitting its power to said wheel axis through the agency of a pinion 5 and of a gear wheel 6 integral with the disc 1. This wheel 6 is housed inside a fluid tight casing 7 arranged in the innermost part of the wheel—i. e., as near as possible to the disc 1.

This casing 7 is extended to form a tubular part 7a which serves for mounting the wheel on the vehicle frame as disclosed hereinafter. In the form shown in Fig. 1, and 21, this tubular part 7a is secured so as to project from an end part 8 of the vehicle frame by a suitable device shown diagrammatically in the drawing as a key 9.

Inside the tubular extension 7a thus secured, there is a stub-shaft 10 which rotates with the gear wheel 6 and disc 1 of the wheel, two or three suitable roller bearings 11 being interposed to support the rotary elements.

This mounting is such that the motor, of which only the driving shaft 4 has been shown in Figures 1 to 3, is supported solely through the casing 7—7a, the only part rotating together with the wheel being the gearwheel 6 and shaft 10.

In the form of execution of Fig. 2, the tubular extension 7 of the casing 7a is attached to the arm 12a of the vehicle fork, the arm 12b of the fork carrying a roller bearing 13 inside which rotates an extension of the shaft 10 which carries the gearwheel 6 and the wheel disc 1. It will be noted that this mounting, shown diagrammatically in the case of a fork, is applicable in a general manner to all the cases where the wheel axis is held at both ends, in contradistinction with an overhung mounting.

Fig. 3 shows a form of the invention adapted for use with an overhung mounting but wherein the wheel is reversed with reference to its position in Fig. 1—i. e., wherein the disc 1 is located on the opposite side of the wheel. For such a mounting, the axle 8 is stationary and integral with the vehicle frame and passes entirely through the motor-containing wheel. In this case, the shaft of Figures 1 and 2 is replaced by a hollow shaft 10a fitted over and rotating about the axle 8.

At the outer end of the stationary axle 8 there is a roller-bearing 11a between it and the hollow shaft 10a. At the inner end of the hollow shaft 10a there is a roller bearing 11 between it and the stationary axle 8. A similar bearing 11b is between the stationary casing 7—7a and the hollow rotating shaft 10a. The case 7—7a is secured at 9 to the end of the axle 8.

Figures 5 and 6, which correspond to the form of the invention illustrated diagrammatically in Fig. 3, show preferred arrangements for transmitting the action of the controlling parts to the controlled parts of the motor and its associated mechanisms. The pipes or ducts and the various control means required to control the operation of the motor and driving mechanism are arranged inside the axle 8. Thereby it becomes possible to avoid floating transmissions and to make connection and disconnection of the transmissions easy when the wheel is being mounted or dismounted.

The transmission for the hand control of a throttle valve 15 of the carburetor 16 of the engine is effected through a rod 17 passing inside the axle 8. The outer end of rod 17 carries a lever 19 connected with throttle valve 15. The inner end of rod 17 carries a lever 18 for connection to the control lever of the driver.

Inside the same axle 8, there is provided on the other hand a pipe 20 for the passage of the fuel, said pipe being adapted for connection at its inner end at 20a with the fuel supply and at its outer end at 20b with the motor carburetor 16. Moreover, if the control of the power-transmitting parts (speed gear, brakes and the like) is to be by a single hydraulic or pneumatic control, there is provided inside the axle 8 a pipe 21 adapted to be connected at its inner end 21a with controlling means and at its outer end 21b with the controlled parts.

Many modifications within the scope of my invention will occur to those skilled in the art; therefore I do not limit to the specific embodiment illustrated and described.

What I claim is:

1. A vehicle wheel comprising a rim, a wheel disc asymmetrically arranged with reference to the rolling plane of the rim, a rotary shaft for the wheel, a gear wheel rigidly secured thereto and rigid with the wheel disc, a protective casing surrounding said gear wheel with a tubular extension for said casing surrounding said rotary shaft and forming a hub, means for securing said tubular extension to the vehicle frame, a motor, a shaft driven by said motor and lying parallel with said rotary shaft, and a pinion on said motor-driven shaft drivingly engaging said gear wheel on the rotary shaft.

2. A wheel as claimed in claim 1, for mounting upon an end part of a vehicle frame, in which said securing means serves to secure the tubular extension to said end part with the wheel disc on the outer side of the vehicle frame with reference to the rolling plane of the rim.

3. A wheel as claimed in claim 1 for mounting upon the end of an axle forming part of a vehicle frame, in which said securing means serves to secure the tubular extension to said axle end with the wheel disc on the inner side of the vehicle frame with reference to the rolling plan of the rim.

4. A wheel as claimed in claim 1, a vehicle frame having arms between which said wheel is mounted, said securing means serving to secure the end of the tubular extension to one of said arms, and a bearing between the rotary shaft and the other arm.

5. In a wheel as claimed in claim 1 for mounting upon the end of an axle forming part of a vehicle frame, said motor having a carburetor with a throttle valve, a rod passing through said axle for controlling said throttle valve and at least one duct passing also through said axle for the passage of controlling fluid therethrough whereby to permit the wheel to be controlled.

6. In a wheel as claimed in claim 1 for mounting upon the end of an axle forming part of a vehicle frame, said motor having a carburetor with a throttle valve, a rod passing through said axle for controlling said throttle valve and a duct passing also through said axle for the passage of the fuel towards the carburetor.

EMILE BOBARD.

REFERENCES CITED

The following references are of record in the file of this patent:

UNITED STATES PATENTS

| Number | Name | Date |
|---|---|---|
| 1,308,602 | Mennesson | July 1, 1919 |
| 1,394,516 | Burlat et al. | Oct. 18, 1921 |
| 1,428,651 | Nelson | Sept. 12, 1922 |
| 1,460,811 | Caleno | July 3, 1923 |
| 1,870,761 | Wiasemsky | Aug. 9, 1932 |